United States Patent [19]

McPherson et al.

[11] Patent Number: 4,873,867

[45] Date of Patent: Oct. 17, 1989

[54] REDUNDANT SIGNAL DEVICE FOR AUTO CRASH TESTING

[75] Inventors: Walter K. McPherson, Marysville; James L. Blaker, West Liberty, both of Ohio

[73] Assignee: TRC, Inc., East Liberty, Ohio

[21] Appl. No.: 155,606

[22] Filed: Feb. 12, 1988

[51] Int. Cl.$^4$ ............................................. G01P 15/08
[52] U.S. Cl. ..................... 73/493; 73/866.4; 434/274
[58] Field of Search ................. 73/493, 866.4; 434/274

[56] References Cited

U.S. PATENT DOCUMENTS

| | | | |
|---|---|---|---|
| 4,261,113 | 4/1981 | Alderson | 73/866.4 |
| 4,598,585 | 7/1986 | Boxenhorn | 73/517 R |
| 4,601,206 | 7/1986 | Watson | 73/514 |
| 4,656,750 | 4/1987 | Pitt et al. | 73/517 R |

Primary Examiner—John Chapman
Attorney, Agent, or Firm—Frank H. Foster

[57] ABSTRACT

An apparatus for measuring the acceleration of the head or thoracic regions of an anthropomorphic dummy used in auto crash testing which is characterized by a mounting arrangement which provides redundant data capability meeting the required government regulations. Three pairs of acceleometers are mounted within test site cavities provided in the crash dummy within the strict government standards to provide two sets of three accelerometers instead of one. Each accelerometer of each pair is accomodated within a mounting structure relative to required standard reference planes and within a supecified location relative to their sensitive axes such that the data obtained therefrom may be used to obtain acceptable redundant force signals for purposes of the crash test.

1 Claim, 3 Drawing Sheets

REDUNDANT SIGNAL DEVICE FOR AUTO CRASH TESTING

BACKGROUND

Government regulations have been established for several years related to various safety standards. The automobile industry must meet such standards set by the Department of Transportation, National Highway Traffic Safety Administration related to crash worthiness. Therefore all such vehicles are subjected to crash testing wherein rigid test procedures and conditions are set forth in government standards and regulations.

Anthropomorphic dummies are employed in auto crash testing and include sensitive instrumentation to measure the forces to which the dummy is subjected to during such tests. The data obtained is used to assess human occupant safety.

For many years, piezoresistive accelerometers have been mounted within the dummies to measure such forces within very rigid specifications associated with assuring that reliable data is obtained.

In view of the extreme abuse necessarily involved in such crash testing, it is not unusual that the instrumentation associated with recording these forces may fail. Such failure requires a re-run of the test which involves the destruction of another new auto. In many instances, a single failure of one of many sensors or its connections with recording equipment requires that the test be re-run.

Of course such re-runs are very costly, therefore, any reduction of the likelihood of causes of such failures is very important. As related to the sensitive instrumentation and recording of data measured by accelerometers, this problem has not been satisfactorily solved prior to the present invention by those skilled in this art.

SUMMARY OF INVENTION

The present invention relates generally to measurement instrumentation for auto crash testing involving anthropomorphic dummies and particularly to a novel arrangement for mounting such measurement devices in the rigidly specified manner prescribed by authoritative government standards.

Given the setting required and the essential nature of recording all the necessary data from instrumentation which must be oriented in given spacial requirements within specific body locations of the crash dummy, the present invention provides a mounting arrangement which accomodates duplicatible measurements of the forces in a reliable manner meeting the necessary government standards. Employing the modified bracket mounting assembly in accordance with the present invention, a plurality of pairs of piezoresistive accelerometers are mounted within the narrow tolerance limits relative to three specific orthogonal reference planes in such a manner that each one of said pair provides reliable redundant test data to dramatically reduce the likelihood of test failure caused by the lack of a necessary measurement being unrecorded during the test.

The ability to record redundant test data and the resultant reduction of any instrumentation failure which would otherwise require a test re-run saves not only the significant labor in set-up and test time, it directly avoids the costly replacement of a new auto used in the test. Considering the cost of the vehicles ranging from the most economical models to the most expensive luxury models, one can readily appreciate that many thousands of dollars are involved in each test run.

In accordance with the test standards required and the present invention, three pairs of accelerometers are mounted in a modified mounting means to cooperate with the cavity forming the test site in the standard anthropomorphic dummy so that each of the sensitive axes intersect at a specified point in the midsagittal plane as related to the thoracic and head region of the dummy.

Each acceleometer of a given pair is associated with one of the accelerometers of the other two pairs to form two groups of three accelerometers, each group being aligned with one another according to government test standards. The required orientation of each group includes spacial requirements related to the horizontal, vertical and midsagittal reference planes and location within close tolerance limits to the intersection of the sensitive axis of each accelerometer within each group of three.

The specified locations of the accelerometers for testing purposes are associated with the calculated center of gravity of the body section in order to measure the forces subjected upon that body section during the crash. The rigid tolerance limits of sensor location is clearly necessary to assure recordal of reliable data, however, prior to the present invention, such restrictions have represented a significant barrier to the ability to obtain redundant data to reduce the likelihood of test failure due to loss of a necessary force measurement.

In accordance with the present invention, the conventional priorly used mounting means has been modified to accomodate the paired location of accelerometers within the strict limits required by government test standards to permit redundant measurements and recordal of all necessary force measurements during the test.

IN THE DRAWINGS

DETAILED DESCRIPTION

Figure 1:
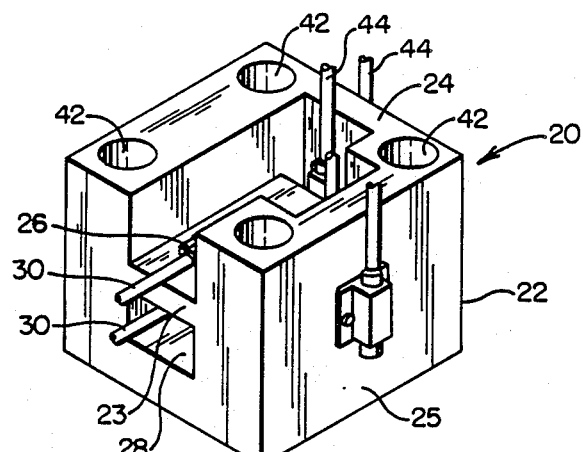
FIG. 1 is a perspective view of a mounting bracket assembly for the head of a standard anthropomorphic test dummy which includes three pairs of piezoresistive accelerometers secured thereto in accordance with the present invention.

A mounting block assembly, indicated generally at 20, for attachment to the force site cavity of a standard anthropomorphic test dummy used in auto crash testing procedures and constructed in accordance with the present invention is shown in FIG. 1.

Figure 2:
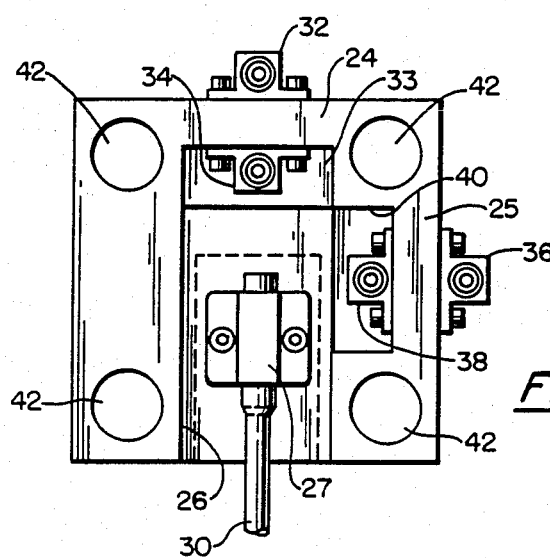
FIG. 2 is a top plan view of the assembly shown in FIG. 1.
Figure 3:
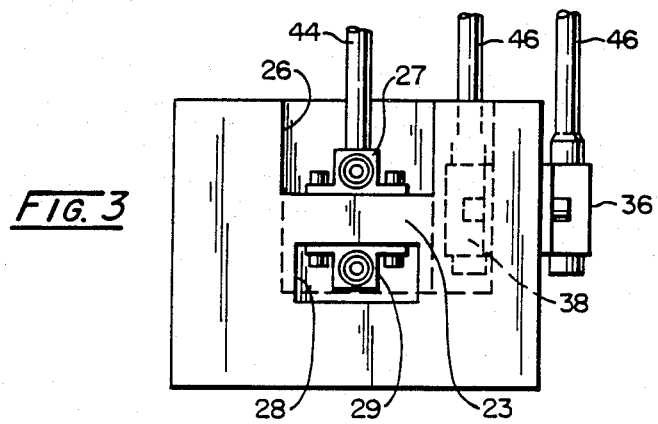
FIG. 3 is a front elevational view of the assembly shown in FIG. 1.
Figure 7:
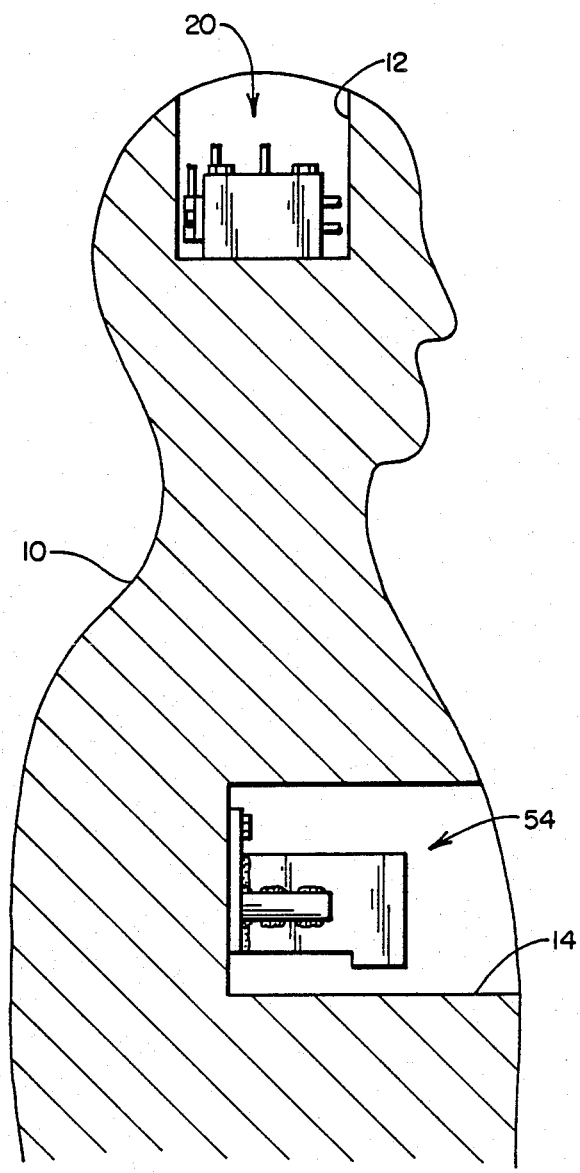
FIG. 7 is a side sectional view of a diagrammatical representation of a conventional test dummy illustrating conventional head and thorax force site cavities.

The mass of mounting block 22 plus the three pair of accelerometers used is identical to the standards required by government regulations for auto crash testing relative to placement within a particular body region of a standard anthropomorphic dummy 10 seen in FIG. 7. This spacial orientation in the dummy is defined by force site cavities 12 and 14, which are related to the calculated center of gravity of the body portion upon which force data is to be measured to obtain reliable data conforming to government requirements. The embodiment shown in FIGS. 1-3 is adapted for placement in the head cavity 12 of the test dummy.

The manner of attaching or securing the block 22 within the designated force site is identical to that well-known and conventional to those skilled in the art.

Block 22 includes three wall segments 23, 24 and 25 forming attaching surfaces which are disposed parallel to three reference planes orthogonal to one another.

Block 22 is provided with inner upper and lower cavities 26 and 28 which are separated by wall segment 23. A pair of conventional piezoresistive accelerometers 27 and 29 are secured in the conventional manner to opposing surfaces of wall segment 23 and include operatively connected conventional wire leads 30.

Another pair of accelerometers 32 and 34 are secured in close proximity to one another to opposing surfaces of wall segment 24 which is provided with a recessed portion 33 to accomodate accelerometer 34. The forward end of accelerometer 34 extends downwardly into a portion of lower cavity 33.

A third pair of accelerometers 36 and 38 are similarly secured to wall segment 25. Wall segment 25 is also provided with a recess portion 40 which accomodates accelerometer 36 and disposes it in close proximity to accelerometer 38.

Fastening holes, such as 42, are provided in each of the four corners of block 22 and are designed to be aligned with complementary openings, not shown, in the specific body cavity force site provided in accordance to government standards set for anthropomorphic test dummies.

As seen in FIGS. 1-3, each pair of accelerometers is mounted on each side of the respective wall segments in a manner which locates them in close association with the other one of the pair. Further, the sensitive axis of each one of the pair are aligned to intersect with the corresponding one of the other pairs at a common reference point associated with three reference planes orthogonal to one another in order to meet the requirements of the applicable government regulations. Further, these regulations which are associated with locating the force sensors at or very close to the center of gravity of the body region under test, specify that the seismic mass center of each accelerometer must be located within very strict tolerance limits relative to a specified distance from the common point of intersection of the sensitive axis referred to above.

Therefore, the wall segments 23, 24 and 25 must provide attaching surfaces which are parallel to the three reference planes orthogonal to each other and also permit the positioning of the accelerometers so as to meet the strict tolerance limits provided in the government specifications and yet fit within the force site cavity in order to provide force measurement data which is considered valid.

Further, this common point of intersection must lie within the midsagittal plane of the three reference planes at specified locations within the force site cavity of the dummy.

Therefore two groups of three accelerometers are formed by the three pairs with one of each pair being associated with one of the remaining pairs to form a group of three sensors which are oriented within strict tolerance limits set by government specifications.

It is important to note that such tolerance limits are relatively small due to the necessity of location of the force sensors to the center of gravity of the body force measuring site in order to be able to obtain force data considered reliable as an indication of the potential for injury to a human occupant. Any deviation from the government specifications renders the data gathered unacceptable for purposes of meeting government standards and therefore valueless.

With reference to the embodiment shown in FIG. 3, the accelerometers 32, 34, 36 and 38 are also provided with independent wire leads such as 44 and 46 which, similar to leads 30, conventionally transmit the force signal to conventional recording instrumentation disposed at a remote location outside the auto under test. Therefore, each pair of accelerometers as described above provide independent, redundant force signals to the recording instruments. Further, each independent signal from the respective one of the pair of sensors satisfactorily meets the test standards. If, for any reason during the crash test, such as accelerometer failure or damage to a lead, for example, one signal of a pair is lost or rendered unusable, the other signal is valid and the test need not be re-run for loss of the data from that particular measuring site.

Figure 4:
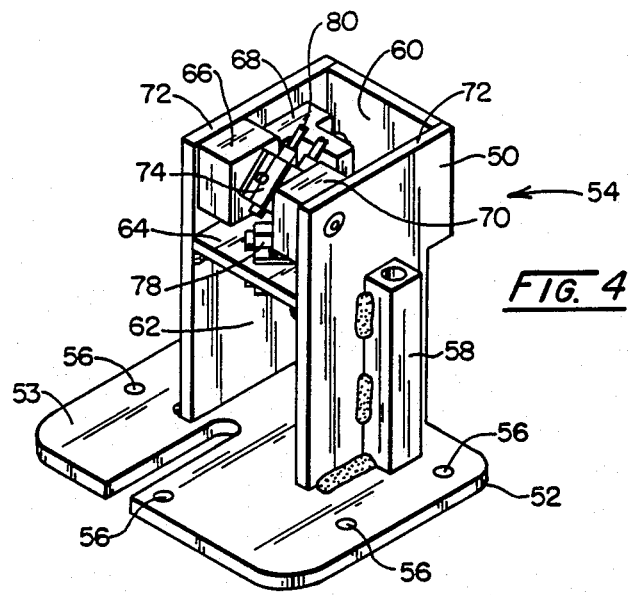
FIG. 4 is a perspective view of a mounting bracket assembly for the thoracic area of a test dummy constructed in accordance with the present invention.
Figure 5:
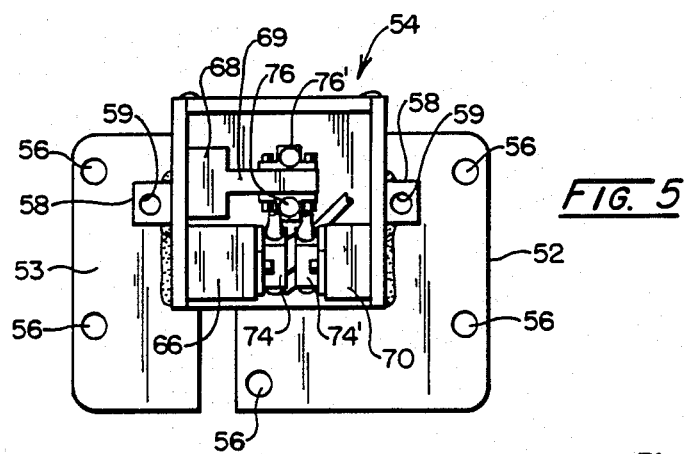
FIG. 5 is a front elevation view of the assembly shown in FIG. 4.
Figure 6:
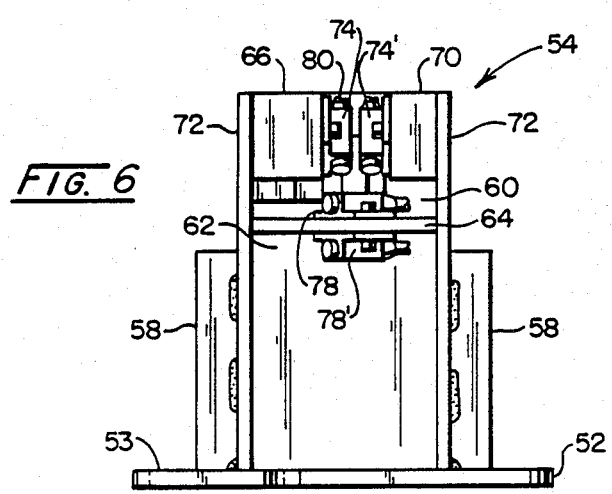
FIG. 6 is a top plan view of the assembly shown in FIG. 4.

Now referring to FIGS. 4-6, another preferred embodiment is shown illustrating a standard mounting bracket 52 forming a part of the mounting assembly, indicated generally at 54. This particular assembly includes the mounting blocks 66, 68 and 70. The bracket 52 is connected to a cavity test site 14 specifically located in the thorax region of a standard anthropomorphic test dummy 10 and also conforms to the required spacial limitation as specified in the applicable government regulations.

The bracket 52 to which mounting blocks 66, 68 and 70 are attached is bolted to the rear vertical surface of the thoracic force site cavity 14, via conventional fasteners extended through holes 56 with the flat plate portion 53 aligned in a vertical manner with the mounting assembly 54 extending horizontally such as shown in FIG. 5. The bracket 52 is located within the force site cavity of the dummy such that the accelerometers mounted thereto have their sensitive axis intersect at a specified point in the midsagittal plane of three reference planes in a similar manner as described with reference to the embodiment of FIG. 3. Further, the force site cavity 14 within the thoracic region is located in relationship to the center of gravity of that body region in a similar manner and for the purpose as described in the embodiment described in FIGS. 1-3.

Bracket 52 is provided with two elongate channel members 58 extending upwardly on each side and provided with a hole 59 to support a threaded fastener, not shown, to further secure the assembly 54 in the force site cavity in a conventional manner.

As best seen in FIGS. 4-6, mounting bracket 52 is provided with a forward cavity 60 and a rear cavity 62 divided from one another by wall segment 64. Forward cavity 60 is also provided with additional wall segments formed by blocklike sensor mounting means 66, 68 and 70 which are fixed to opposing side walls 72 forming the outer frame of bracket 52. Wall segment 64 and mounting means 66, 68 and 70 are specifically designed to provide attachment surfaces for aligned pairs of accelerometers, such as 74, 76 and 78 which allow the precise location of each pair thereof with respect to the other sensor of a pair as well as each pair to the remaining pairs.

This alignment of the pairs of accelerometers must assure that the sensitive axes of a set of three intersect at a common reference point and are parallel to the attachment wall surfaces and one of the three orthogonally disposed reference planes.

As shown in FIGS. 4-6, one of each of the accelerometers 74 are conventionally attached to the opposing inner wall surface of mounting means 66 and 70 so as to be disposed closely adjacent to one another.

The pair of accelerometers 76 are conventionally attached on opposite sides of parallel wall surfaces formed by an inwardly extending narrowed portion 69 of mounting means 68. The remaining pair of accelerometers 78 are attached, using a conventional means, to the front and rear parallel wall surfaces of wall segment 64 in a position properly aligning each of their sensitive axis parallel to the wall surfaces in accordance with government test regulations mentioned earlier herein.

In addition, the attachment wall surfaces or wall segments formed by mounting means 64, 66, 68 and 70 are disposed within the confines of bracket 52 in a manner which permits the precise location of each accelerometer of each pair such that their seismic mass centers are located within a given specified distance from the prescribed common reference point related to the intersection of the sensitive axes of the sensors.

Each of the accelerometers also are provided with separate, conventional conducting leads, such as partially indicated at 80, which are operatively connected to conventional recording devices in a manner which represents individual data channels for each accelerometer that conform to the requirements of standards set by government regulations.

In view of the foregoing description, those skilled in the art should readily appreciate that redundant sets of force measurement data may be recorded in accordance with the teaching of the present invention wherein each measurement conforms to the required government standards and therefore represents valid data for the purposes of the test. In a similar manner as described with respect to the embodiment shown in FIGS. 1-3, the percentage of test re-runs occasioned by loss of a particular force measurement necessary for a valid test is dramatically reduced which correspondingly reduces the risk of re-runs and the attending high cost associated therewith.

What is claimed is:

1. An apparatus for measuring simulated body forces relative to certain reference planes comprising an anthropomorphic dummy; a force site cavity within said dummy, and a mounting block provided with acceleration sensing means mounted within said force site cavity, said mounting block comprising, in combination;

(1) at least three wall segments forming a mounting block cavity; a respective one of said three wall segments positioned parallel to a respective one of three reference planes disposed perpendicular to and intersecting one another; a first one of said three wall segments forming a first pair of opposing parallel attachment surfaces closely spaced from one another wherein at least one of said first pair of attachment surfaces is disposed within the interior of said cavity; a second one of said three wall surfaces forming a second pair of opposing, parallel attachment surfaces closely spaced from one another wherein at least one of said second pair of attachment surfaces is disposed within the interior of said cavity, and a third one of said three wall segments forming a third pair of opposing parallel attachment surfaces closely spaced from one another wherein at least one of said third pair of attachment surfaces is disposed within the interior of said cavity;

(2) force sensing means including a first pair of acceleration sensing means, a respective one of said first pair mounted to a respective one of said first pair of attachment surfaces with respective seismic mass centers disposed within a predetermined distance from a selected common reference point, a second pair of acceleration sensing means; a respective one of said second pair mounted to a respective one of said second pair of attachment surfaces with respective seismic mass centers disposed within a predetermined distance from said selected common reference point; and a third pair of acceleration sensing means, a respective one of said third pair mounted to a respective one of said third pair of attachment surfaces with respective seismic mass centers disposed within a predetermined distance from said selected common reference point; and whereof the sensitive axis of each member forming a respective pair of acceleration sensing means is aligned parallel to the sensitive axis of the other member of the pair and perpendicular to one of said reference planes to intersect the sensitive axis of one member of two different pairs of acceleration sensing means at a selected point within said mounting block cavity.

* * * * *